United States Patent
Wakaki et al.

(10) Patent No.: US 6,820,991 B2
(45) Date of Patent: Nov. 23, 2004

(54) LIGHT EMITTING DEVICE AND VEHICLE DISPLAY DEVICE

(75) Inventors: Ryosuke Wakaki, Anan (JP); Hiroshi Tominaga, Kariya (JP); Kazumasa Kurokawa, Kariya (JP)

(73) Assignee: Nichia Corporation, Tokushima (JP)

( * ) Notice: Subject to any disclaimer, the term of this patent is extended or adjusted under 35 U.S.C. 154(b) by 11 days.

(21) Appl. No.: 10/332,960

(22) PCT Filed: May 14, 2002

(86) PCT No.: PCT/JP02/04631

§ 371 (c)(1),
(2), (4) Date: Jan. 14, 2003

(87) PCT Pub. No.: WO02/093535

PCT Pub. Date: Nov. 21, 2002

(65) Prior Publication Data

US 2004/0004826 A1 Jan. 8, 2004

(30) Foreign Application Priority Data

May 14, 2001 (JP) ........................................ 2001-142495

(51) Int. Cl.[7] .............................................. G01D 11/28
(52) U.S. Cl. ........................ 362/27; 362/555; 362/230; 362/23; 116/288
(58) Field of Search ........................ 362/27, 230, 555, 362/800, 23, 28, 29, 30, 26, 31; 116/48, 286, 287, 288, DIG. 36

(56) References Cited

U.S. PATENT DOCUMENTS

| 4,257,084 A | * | 3/1981 | Reynolds ..................... 362/31 |
| 5,142,453 A | * | 8/1992 | Ohta et al. ..................... 362/29 |
| 5,327,328 A | * | 7/1994 | Simms et al. ................. 362/26 |
| 6,120,158 A | * | 9/2000 | Ishimaru et al. ............. 362/26 |

FOREIGN PATENT DOCUMENTS

| JP | 60-4221 | 2/1985 |
| JP | 11-281409 | 10/1999 |
| JP | 11-344944 | 12/1999 |
| JP | 2000-221059 | 8/2000 |
| JP | 2001-21390 | 1/2001 |

* cited by examiner

Primary Examiner—Thomas M. Sember
Assistant Examiner—Bao Q. Truong
(74) Attorney, Agent, or Firm—Wenderoth, Lind & Ponack L.L.P.

(57) ABSTRACT

A light emitting apparatus includes a light guiding member that projects light, incident on an end face thereof, through a principal plane; and a plurality of light emitting diodes that are optically coupled with the end face. The light guiding member has a protruding surface formed in part of the end face thereof and comprises a first light introducing portion that is formed on the protruding surface and is optically coupled to a first light emitting diode, and a second light introducing portion that is optically coupled to a second light emitting diode and is formed on the rest of the end face. The first and second light emitting diodes are capable of emitting color-blended light having two or more peaks in the spectrum.

20 Claims, 18 Drawing Sheets

LIGHT EMITTING DEVICE AND VEHICLE DISPLAY DEVICE

TECHNICAL FIELD

The present invention relates to a light emitting apparatus that projects light emitted by a light emitting diode through a light guiding member. More particularly, it relates to a light emitting apparatus and a vehicle instrument panel display used in vehicles or as the pointer of various meters.

BACKGROUND ART

Light emitting apparatuses currently in use include, for example, light bulbs and fluorescent lamps that are used so that meters of automobiles and motorcycles can be recognized at night. Light bulbs, however, are not appropriate due to problems related to reliability, power consumption and size. Fluorescent lamps have problems such as requiring ancillary devices necessary for alternating current driving, and containing mercury that is used inside the lamp and may be released into the atmosphere when the vehicle is scrapped. Meanwhile, a light emitting diode having a relatively simple constitution of a single-chip, 2-terminal construction that is capable of emitting white light has been developed. Such a light emitting diode uses an LED chip that is a semiconductor light emitting device having high reliability with low power consumption and is capable of being designed to be small in size, and a fluorescent substance that converts light emitted by the LED chip in at least a part of the spectrum so as to emit blended light such as white light.

The light emitting diode as described above may be applied to a meter pointer of a vehicle or a bar-shaped light source as shown in FIG. 6. The apparatus shown in FIG. 6 comprises bullet-shaped light emitting diodes 602 disposed at an end of a needle-shaped light guiding member 601. The light emitting diode comprises an LED chip and a fluorescent substance that absorbs light emitted by the LED chip and converts the wavelength thereof. When the light emitting diode is fed with current, blue light emitted by the LED chip and color-blended light produced by the fluorescent substance that absorbs the blue light emitted by the LED chip and emits yellow light are introduced into a light guiding member. The light guiding member is covered with a reflecting member except for a surface thereof through which light is emitted, so that light is repetitively reflected within the light guiding member before being emitted in a needle-shaped beam through the surface that is not covered by the reflecting member. By using the needle-shaped light guiding member of such a construction as a meter pointer, such a light emitting apparatus can be made that is small in size, light in weight, high in reliability and efficiency, and is environment-friendly.

However, the light emitting apparatus of the constitution described above cannot meet the requirements of higher brightness and smaller size that are currently imposed in such a trend that the meter panel is covered with a filter for decorative purposes. While light intensity can be increased by increasing the current supplied to the light emitting apparatus, there is a limitation due to heat dissipation, rated operating current, circuit construction, and other factors. When the number of light emitting diodes shown in FIG. 6 is simply increased, on the other hand, a larger space is required and color blending between the light emitting diodes becomes a problem. That is, while the light emitting diode is formed on a semiconductor wafer by a MOCVD process or the like, it is very difficult to achieve a uniform light emission characteristic, drive characteristic and other properties among some 20,000 pieces of semiconductor light emitting diode that are manufactured from the same wafer, since the properties are affected by the flow rate of gas, temperature distribution and other factors.

As a result, when two or more LED chips are used, there is such a problem that unevenness in color and/or brightness of light emitted by the light emitting apparatus through blending of light from the plurality of LED chips leads to a lower yield of production. Selective use of the LED chips also results in a lower yield of production.

In the case of a light emitting diode that utilizes light emitted by an LED chip and a fluorescent substance that absorbs the light emitted by the LED chip and converts the wavelength thereof, in particular, the problems described above become conspicuous together with the problems of light emission characteristic and uneven distribution of the fluorescent substance. These problems are serious because the human eye is capable of perceiving a difference in hue more distinctly in a white region.

SUMMARY OF THE INVENTION

An object of the present invention is to provide a light emitting apparatus capable of satisfactorily blending light color and emitting light with high brightness with a small construction, and a vehicle instrument panel display.

The present invention provides a light emitting apparatus comprising a light guiding member that projects light, that is incident on an end face thereof, through a principal plane, and a plurality of light emitting diodes that are optically coupled with the end face. The light guiding member has a protruding surface formed in part of the end face thereof, and comprises a first light introducing portion that is formed on the protruding surface and is optically coupled to a first light emitting diode. A second light introducing portion is optically coupled to a second light emitting diode and is formed on the rest of the end face. The constitution described above produces a light emitting apparatus capable of satisfactorily blending light colors and emitting light with high brightness. In the present invention, the light guiding member preferably has a part of a surface protruding on the side of the principal plane that emits light or on the side opposing the principal plane. Such a constitution described above produces a light emitting apparatus capable of satisfactorily blending light colors and emitting light with high brightness.

Also in the present invention, the first light emitting diode and the second light emitting diode are preferably surface-mounted light emitting diodes, with a light emitting portion of the first light emitting diode being higher than that of the second light emitting diode. In this constitution, since the portion of the light emitting plane of the first light emitting diode where the emitted light is observed is higher than the second light emitting diode, all the light emitted by the first light emitting diode is introduced into the light guiding member without being blocked by the second light emitting Therefore, a light emitting apparatus of high brightness can be made.

The present invention also provides a light emitting apparatus comprising a light guiding member that has a distal end, an end face opposing the distal end, and a principal plane located between the former two so as to project the light incident on the end face through the principal plane, and at least first and second light emitting diodes are optically connected to the end face of the light guiding member. The end face of the light guiding member is made in such a structure that the optical path over which light propagates through the light guiding member is different in length depending on which of the light emitting diodes emits the light. Such a constitution described above produces a light emitting apparatus capable of satisfactorily blending light colors and emitting light with high brightness.

In the present invention, the light guiding member has a shape of a plate having the end face and an end face opposing the former end face. The end face of the light guiding member has two portions corresponding to the first and second light emitting diodes, and the optical path between the first end face portion and the end face is made longer than the optical path between the other end face portion and the end face. Such a constitution described above produces a light emitting apparatus capable of satisfactorily blending light colors and emitting light with high brightness.

Also in the present invention, the end face of the light guiding member is preferably made in a stepped structure having a protruding surface in which the one end face portion protrudes beyond the axial direction of the light guiding member with respect to the other end face portion. Such a constitution described above produces a light emitting apparatus capable of satisfactorily blending light color and emitting light with high brightness.

Also in the present invention, the stepped structure of the light guiding member is preferably disposed in a direction perpendicular or parallel to the axial direction between the distal end and the end face of the light guiding member. Such a constitution described above produces a light emitting apparatus capable of satisfactorily blending light color and emitting light with high brightness.

Also in the present invention, the protruding surface of the light guiding member is preferably located outside the visible region of the light guiding member. Such a constitution described above produces a light emitting apparatus capable of satisfactorily blending light color and emitting light with high brightness.

Also in the present invention, the first and second light emitting diodes are preferably capable of emitting color-blended light having two or more peaks in the spectrum. Such a constitution described above produces a light emitting apparatus capable of satisfactorily blending light color and emitting light with high brightness.

Also in the present invention, the light emitting apparatus is preferably an instrument meter pointer. This makes it possible to make an instrument meter pointer having high brightness.

Also in the present invention, the light emitting apparatus preferably has a substrate on which the light emitting diode and circuit elements are mounted. Thus, the light emitting apparatus can effectively utilize the space.

The present invention also provides a vehicle instrument panel display comprising any one of the light emitting apparatuses described above as a meter pointer of an instrument panel installed in a vehicle. Thus the meter pointer for vehicles capable of satisfactorily blending light color and emitting light with high brightness can be made.

BRIEF DESCRIPTION OF THE DRAWINGS

FIG. 3B is a schematic sectional view of a light emitting apparatus explanatory of the constitution according to the present invention, while

DETAILED DESCRIPTION OF THE INVENTION

The present inventors conducted various experiments and completed the present invention upon finding that a light emitting apparatus that has a high color-blending performance and a high efficiency of utilizing light and is suitable for mass production can be made by designing the arrangement of two or more light emitting diodes and a light guiding member in a particular construction.

Now, a needle-shaped light emitting apparatus shown in the schematic sectional view of FIG. 3B will be described below. FIG. 3A and FIG. 3C show light emitting apparatuses for comparison with the present invention. The light emitting apparatuses shown in FIG. 3A and FIG. 3C introduce light emitted by two light emitting diodes 332 that are disposed one above another on a flat end face of the needle-shaped light guiding member. In FIG. 3A, light emitted by each of the light emitting diodes 332 spreads from the light introducing portion and, therefore, uniform light intensity distribution cannot be achieved until the light covers the thickness of the light guiding member 301, thus resulting in poor color blending performance when the entire region is utilized. With the structure shown in FIG. 3C, on the other hand, although a region of uniform color blending can be secured by increasing the length of the light guiding member 301, dead space increases and more light is diffused and absorbed in the light guiding member 301 resulting in lower brightness of light emission. Although the light guiding member 301 transmits light, the light is absorbed therein while being reflected repetitively and diffused. Therefore, a slight increase in the length results in a sharp decrease in brightness. This means that color blending performance and brightness of emitted light are traded-off for each other in this constitution.

Figure 3B:
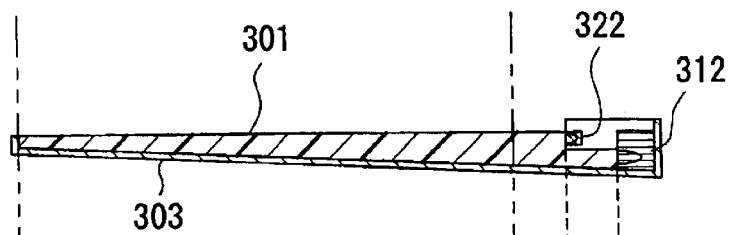
Figure 3A:
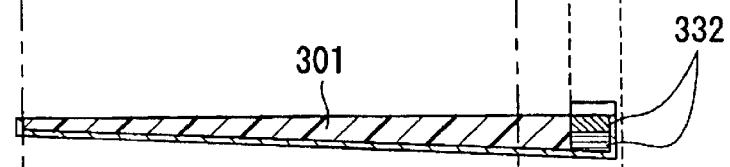
FIG. 3A and FIG. 3C are schematic sectional views of a light emitting apparatus shown for comparison with the present invention
Figure 3C:
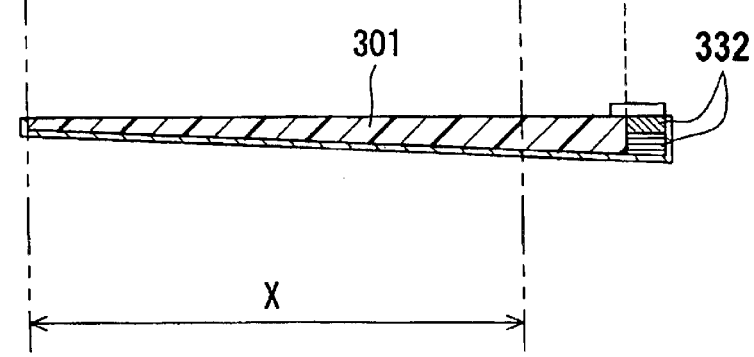

According to the present invention, as shown in FIG. 3B, a step is formed in the light introducing portions that introduce light from a plurality of light emitting diodes into the light guiding member 301. This structure makes it possible to achieve both good color blending performance and high brightness of emitted light that have otherwise been trade-offs. That is, as will be understood from FIG. 3B, it is presumably because a difference is given to the optical path length in the light guiding member 301 to make a functionally separated structure, so that light emitted by the light emitting diode 322 that travels over a shorter length in the light guiding member 301 is effectively utilized so as to achieve a high brightness, while light emitted by the light emitting diode 312 that travels over a longer length in the light guiding member 301 is utilized to improve the color blending performance in a range X from the end face to the visible range of the light guiding member 301. It is assumed that such a structure enables elimination of the dead space and emission of light with a higher brightness than that achieved by the light guiding member that has a flat light introducing portion. Now various constitutions employed in the present invention will be described in detail below.

(Light Guiding Member 301)

The light guiding member used in the present invention receives light emitted by a plurality of light emitting diodes and emits the light in a beam of desired shape. The light guiding member may be formed from materials that transmit light and can be easily formed, such as polycarbonate resin, acrylic resin, amorphous polyolefin resin and polystyrene resin. Depending on the application, various inorganic materials such as glass can be used in addition to organic materials such as resin. The light guiding member may have two or more light introducing portions formed at the end thereof. The light introducing portion of the present invention has a second light introducing portion with a shorter optical path over which light propagates through the light guiding member, and a first light introducing portion with a longer optical path over which light propagates through the light guiding member as compared to the second light introducing portion. Preferably disposed on the first and second light introducing portions are light emitting diodes that emit light with directivity. In order to emit light uniformly from a light emission observing plane of the light guiding member, a light diffusion sheet or a prism sheet may be provided on the light emission observing plane or on the surface opposing thereto, or a micro lens, prism or constricted portion may be provided on the light emission observing plane of the light guiding member. The light guiding member may also be formed in a shape such that a part thereof protrudes in the principal plane from which light is emitted, namely the light emission observing plane, or in a surface opposing the principal plane. Such a structure makes it possible to improve the color blending performance and achieve a light emitting apparatus of high brightness.

Moreover, a diffusion agent may be included in the light guiding member so as to improve the uniformity of light emission, or a coloring agent may be included so as to emit light of a desired color. The diffusion agent or the coloring agent may be included in the light guiding member with either uniform distribution or graded distribution. The diffusion agent may be formed from acrylic resin, polycarbonate resin, amorphous polyolefin resin, polymethylene pentene resin or the like. The coloring agent may be any proper pigment or dye, while fluorescent dye or fluorescent pigment may also be used.

Figure 11:
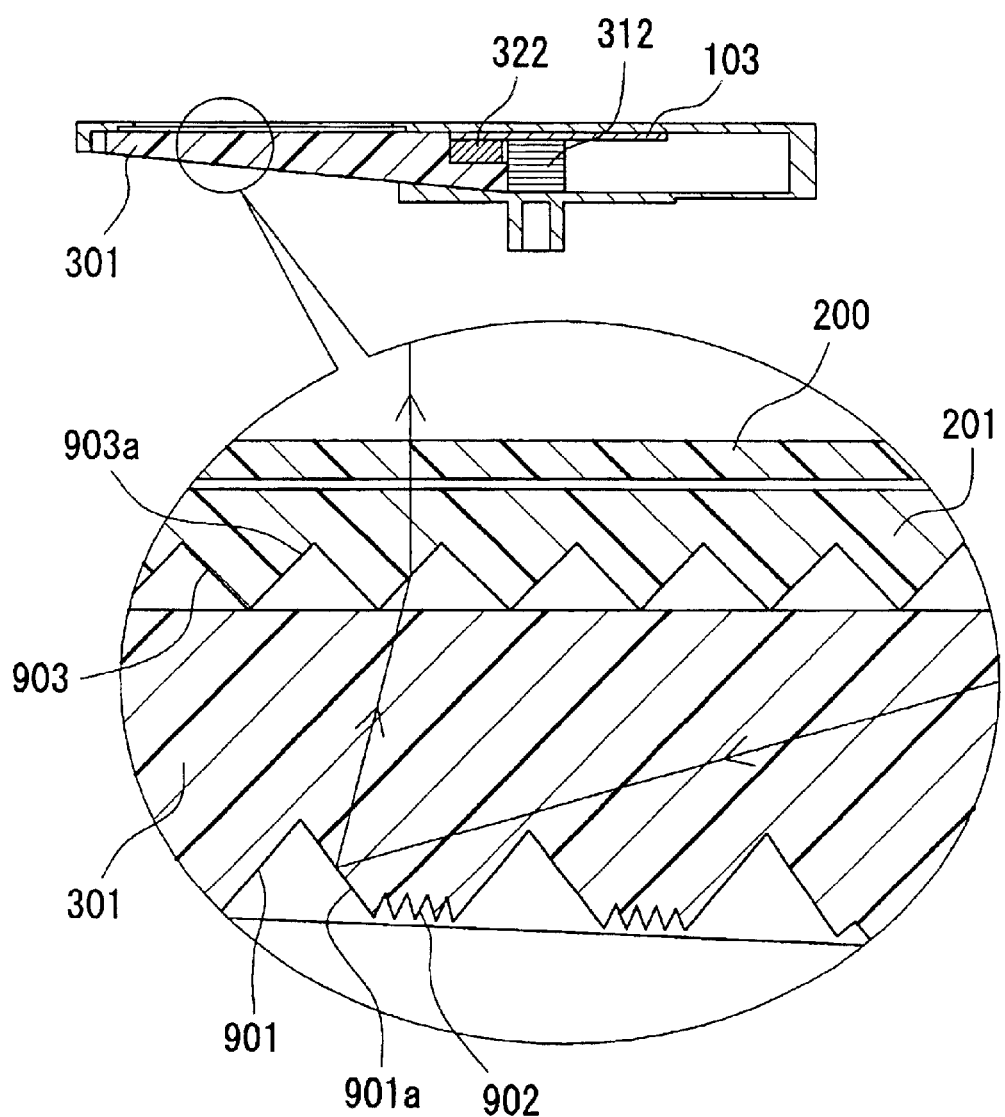
FIG. 11 is a schematic diagram showing an embodiment of the present invention.
Figure 26A:
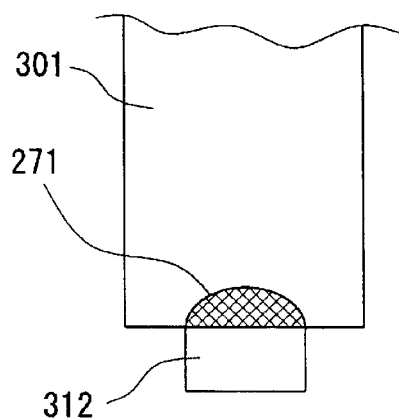
FIGS. 26A and 26B are schematic diagrams showing an embodiment of the present invention.
Figure 26B:
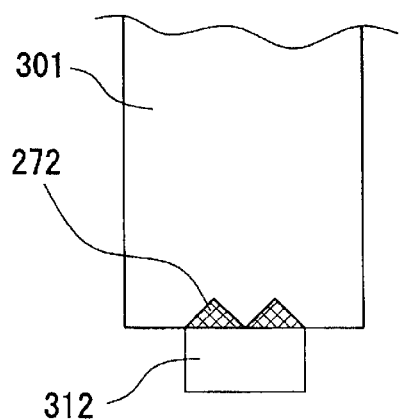

The light introducing portion of the light guiding member may be formed as a flat surface or, as shown in FIGS. 26A and 26B, to have a concave 271 (FIG. 26A), groove, notch 272 (FIG. 26B) or constriction shape so as to diffuse the light emitted by the light emitting diode 312 more efficiently. In the present invention, since two or more light emitting diodes can be made with different angles of directivity, the light introducing portion may be formed in different shapes accordingly. In a convex light introducing portion that brings about a longer optical path, in particular, the notch is made smaller so as to improve the directivity, while the light introducing portion at the bottom that provides a shorter optical path than the convex portion may be formed so as to cause lower directivity, thereby further improving the brightness of emitted light and color blending performance. When the surface area is increased in the convex light introducing portion that brings about a longer optical path, and surface area is decreased in the light introducing portion at the bottom that provides a shorter optical path than the convex portion, brightness of emitted light and color blending performance can be further improved. The surface that opposes the light emission observing plane of the light guiding member may also be formed into a prism. For example, a first prism surface 901 with a train of prisms (FIG. 11) each having a jagged prism configuration having a triangular cross section may be formed in parallel, and a jagged configuration 902 with smaller ups and downs may also be formed on the side of the concave or convex portion of the larger jagged configuration 901 (FIG. 11). This arrangement causes the light emitted by the light emitting diode to reflect or scatter on a side face 901a of the first prism surface 901 with a train of prisms as shown in FIG. 11, and to be diffracted by a side face 903a of a second train of prisms forming a second prism surface 903 provided on the cover 201 so as to be directed toward a translucent panel 200, thus resulting in improved efficiency of extracting light from the light emitting apparatus.

It is preferable to form a shape of an acute angle at the end face 904 of the light guiding member (see FIG. 1A) that opposes the light introducing surface of the light emitting diode, in order to improve the efficiency of utilizing light by efficiently reflecting light emitted by the light emitting diode. The acute angle is preferably in a range from 75 to 105 degrees, and more preferably at a right angle.

(Light Emitting Diodes 312, 322)

Various types of light emitting diodes can be used in the present invention, as long as light can be efficiently introduced into the light guiding member. For example, an SMD (surface-emitting type) type light emitting diode or a bullet-shaped light emitting diode may be used. Also, an LED chip that is a bare light emitting element may be used as the light emitting apparatus. For the first light emitting diode and the second light emitting diode, those capable of emitting color-blended light having two or more peaks in the spectrum may be used, or those capable of emitting single-color light having one peak in the spectrum may be used, or those of different types may be used in combination.

Materials for the light emitting device may be semiconductor materials such as BN, SiC, ZnSe, GaN, InGaN, InAlGaN, AlGaN, BAlGaN or BInAlGaN. These elements with an impurity element such as Si or Zn added thereto may be used as the light emission center. The structure of the semiconductor may be a homo-structure, a hetero-structure or a double hetero-structure that may have an MIS junction, a PIN junction or a pn junction. The wavelength of the emitted light may be selected by changing the materials and/or mix proportion of the semiconductor. Output power may be increased by forming the semiconductor active layer in a thin film of a single quantum well structure, or a multiple quantum well structure that generates a quantum effect.

The light emitting device that emits color-blended light such as white light by the light emitting diode using a fluorescent substance is preferably a nitride semiconductor (for example, nitride semiconductor including Al and Ga or nitride semiconductor including In and Ga having composition of $InI_XAl_YGa_{1-X-Y}N$, $0 \leq X$, $0 \leq Y$, $X+Y \leq 1$).

When a nitride semiconductor is used, a substrate for the semiconductor is preferably made of such material as sapphire, spinel, SiC, Si, ZnO, GaAs or GaN. In order to form the nitride semiconductor of good crystallinity favorably in mass production, a sapphire substrate is preferably used. The nitride semiconductor is formed on the sapphire substrate by a process such as HVPE or MOCVD. A buffer layer made of a material that enables it to grow an amorphous crystal at a low temperature such as GaN, AlN or GaAlN, is formed on the sapphire substrate, and the nitride semiconductor that has a pn junction is formed thereon.

A light emitting device made of a nitride semiconductor having a pn junction that is capable of efficiently emitting light in an ultraviolet region may be made by forming a stripe of $SiO_2$ on the buffer layer substantially at a right angle to the orientation flat surface of the sapphire substrate. GaN is grown on the stripe through ELOG (Epitaxial Lateral Over Grows GaN) by the HVPE process. Then a double hetero-junction structure may be constituted by forming a first contact layer from n-type gallium nitride, a first cladding layer from n-type aluminum gallium nitride, an active layer with a multiple quantum well structure comprising a plurality of well layers of n-type indium aluminum gallium nitride, and barrier layers from n-type aluminum gallium nitride stacked one on top of another, a second cladding layer of p-type aluminum gallium nitride, and a second contact layer of p-type gallium nitride by the MOCVD process.

The nitride semiconductor shows n-type conductivity when not doped with an impurity. In order to form a desired n-type nitride semiconductor for such a purpose as improving the efficiency of light emission or the like, it is preferable to introduce an n-type dopant such as Si, Ge, Se, Te or C. In order to form a p-type nitride semiconductor, it is preferable to introduce a p-type dopant such as Zn, Mg, Be, Ca, Sr or Ba. Since a nitride semiconductor does not easily turn into a p-type simply by doping the semiconductor with a p-type dopant, it is desired to decrease the resistance by heating the semiconductor in a furnace or irradiating the semiconductor with plasma after introducing the p-type dopant. When the sapphire substrate is not taken, the p-type layer is etched down to the surface of the first contact layer so as to expose the contact layer. After forming electrodes on the contact layers, the semiconductor wafer is cut into chips, thereby making the light emitting devices made of the nitride semiconductor.

The fluorescent substance can be one that can emit light efficiently by the spectrum emitted from the semiconductor light emitting device, such as YAG: Ce fluorescent substance or a derivative of perylene is used in case the light emitting device emits blue visible light. When the light emitting device emits ultraviolet ray, a material may be used such as alkali earth metal halogen apatite fluorescent substance including at least Mn and/or Cl that is activated with Eu. By providing such a fluorescent substance on the LED chip, the light emitting diode capable of emitting white light can be formed. According to the present invention, a first SMD type light emitting diode having a thickness substantially equal to the thickness of the light guiding member is disposed on the convex-shaped light introducing portion that provides a longer optical path, and a second SMD type light emitting diode that can be accommodated on the thinner light guiding member is disposed on the light introducing portion located at the bottom that provides a shorter optical path than that of the convex portion. This construction enables the light emitting apparatus to efficiently utilize the space of the light emitting diodes and can be disposed on the substrate without making any adjustment to the electrodes of the SMD type light emitting diodes.

(Translucent Panel 200)

The translucent panel 200 of this embodiment is a translucent member disposed on the cover 201. As a result, light propagating through the light guiding member 301 is observed through the translucent panel 200.

The translucent panel 200 is made of a material that has high light transmissivity and high moldability such as polycarbonate resin, acrylic resin, amorphous polyolefin resin and polystyrene resin. Depending on the application, various inorganic materials such as glass can be used in addition to organic materials such as resin. The translucent panel 200 is molded into a desired shape by injection molding from a material as described above.

(Cover 201)

The cover 201 of this embodiment is a translucent member disposed on the light guiding member 301.

The cover 201 is made of a material that has high light transmissivity and high moldability such as polycarbonate resin, acrylic resin, amorphous polyolefin resin and polystyrene resin. Depending on the application, various inorganic materials such as glass can be used in addition to organic materials such as resin. The cover 201 is molded into a desired shape by injection molding from a material as described above.

Since the cover 201 used in this embodiment can be processed to form prisms on the surface that opposes the light guiding member 301, the efficiency of extracting light in the direction of the light emission observing plane can be improved with a relatively simple construction without the necessity of providing a lens sheet or diffusion sheet between the light guiding member 301 and the cover 201. The prisms of this embodiment are formed by disposing a train of prisms 903 (FIG. 11) having a jagged configuration with a triangular cross section. The cover 201 with a configuration as described above is formed by injection molding using a die that has a shape of the train of prisms having triangular cross sections.

(Frame Member)

The frame member of this embodiment comprises an upper frame member 204 and a lower frame member 202. The lower frame member 202 is a member whereon a reflecting member 303, a light guiding member 301 and a substrate 103 are mounted. The upper frame member 204 is a member that can be fitted without a gap to the lower frame member 202 so as to cover the reflecting member 303, the light guiding member 301 and the substrate 103 that are mounted on the lower frame member 202.

The frame member may be made of a material that has high moldability such as polycarbonate resin, acrylic resin, amorphous polyolefin resin, polystyrene resin or polypropylene resin. The frame member is molded into a desired shape by injection molding from a material as described above.

Of the surfaces of the frame members, the surface that faces the inside of the light emitting apparatus and receives light from the light emitting diode may be coated with metal plating or a metal film such as silver or aluminum formed by vapor deposition. This makes it possible to make the light emitting apparatus that emits light with higher brightness relatively easily using less parts without using a reflector sheet or a reflecting member.

A emitting apparatus that emits light with higher brightness may also be made relatively easily using less parts without employing such a process as metal plating or vapor deposition, by forming the frame members with high reflectivity material.

Furthermore, the upper frame member 204 or the lower frame member 202 may be molded with two colors. For example, the upper frame member 204 may be formed from a white resin on the inside and a black resin on the outside thereof. Alternatively, the frame may be formed from a white resin that is then covered with a black coating on the outside. A light emitting apparatus that emits light with higher brightness can be made with such a construction.

(Reflecting Member 303)

The reflecting member 303 is used to efficiently reflect the light that is received from the light guiding member 301 and project it through the light emission observing plane. In order to efficiently emit the light from the light guiding member 301 through the light emission observing plane, it is preferable to cover the light guiding member with a reflecting member except for the light emission observing plane and the light introducing portion. The reflecting member may be provided either by vapor deposition of a metal such as silver on the light guiding member 301, or by bonding a thin sheet thereto. When the reflecting member is bonded onto the light guiding member 301, it is preferable to use an acrylic-based or silicon-based adhesive that has high transparency, in order to have the light emitted by the LED chip reach the reflecting member without loss and have the reflected light be transmitted to the light emission observing plane without loss. The light emitted by the LED chip can be extracted efficiently by covering the light guiding member with a resin sheet that includes a reflecting material such as titanium oxide, barium titanate, barium sulfide or aluminum oxide added thereto, or a mirror-like reflector sheet made of a film coated with silver, aluminum or the like by vapor deposition.

(Embodiment 1)

Figure 1A:
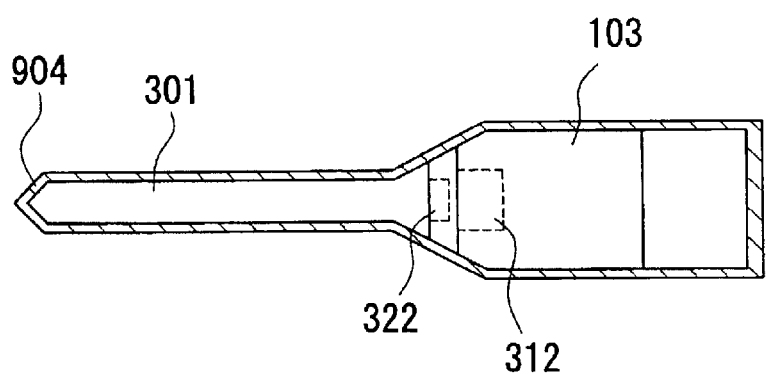
FIG. 1A is a schematic plan view explanatory of the constitution of a light emitting apparatus according to the present invention.
Figure 1B:
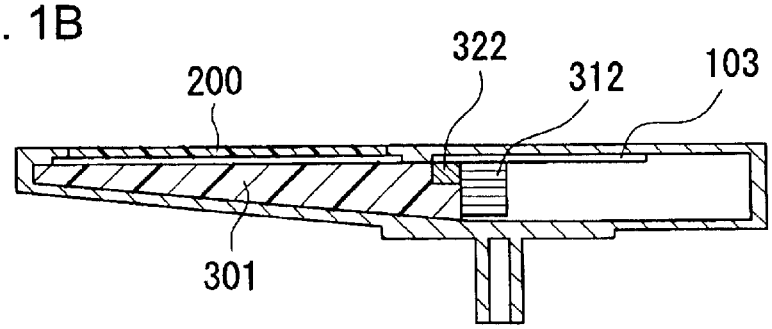
FIG. 1B is a schematic sectional view thereof.
Figure 2:
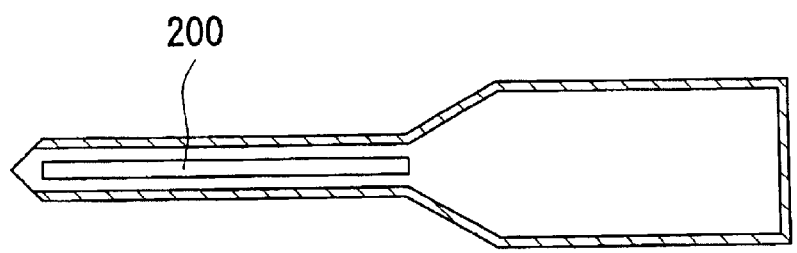
FIG. 2 is a schematic plan view of a meter pointer that uses a light guiding member of the present invention.

FIG. 2 shows a meter pointer that uses the light guiding member of the present invention, FIG. 1A being a plan view thereof showing the constitution and FIG. 1B being a schematic sectional view of the present invention. According to the present invention, the light guiding member 301 is formed by injection molding using a hopper of acrylic resin. In the die used in the injection molding, one end face of the needle-shaped light guiding member is formed into first end face 904 with an acute angle (about 90 degrees) when viewed from the plane, and the other (second) end face is formed to be wider than the first end face so as to optically couple with the light emitting surface of the light emitting diode. By forming the first end face with an acute angle (about 90 degrees) with respect to the plan and/or sectional view, light incident on the first end face after being transmitted through the light guiding member 301 is reflected on the side face that forms the first end face so as to be directed toward the inside of the light guiding member, and the reflected light is further reflected on the inner wall of the light guiding member so as to be directed toward the light emission observing plane, thereby improving the efficiency of the light emitting apparatus to extract light.

The light guiding member 301 has a protruding first light introducing portion formed on the second end face thereof which is to be optically connected to the light emitting diode 312, and a second light introducing portion formed so as to provide a shorter optical path than that of the first light introducing portion. The surface area of the first light introducing portion of the light guiding member 301 is large, and the surface area of the second light introducing portion is smaller than that of the first light introducing portion. Specifically, the rod-shaped light guiding member 301 is nearly 50 mm in length and has the light introducing portions disposed one above the other, so that the convex light introducing portion protrudes beyond the second light introducing portion by about 2 mm. The first end face of the light guiding member is about 1 mm thick, and the first light introducing portion at the second end face is about 1.7 mm thick. The second light introducing portion is about 0.3 mm thick.

Figure 4:
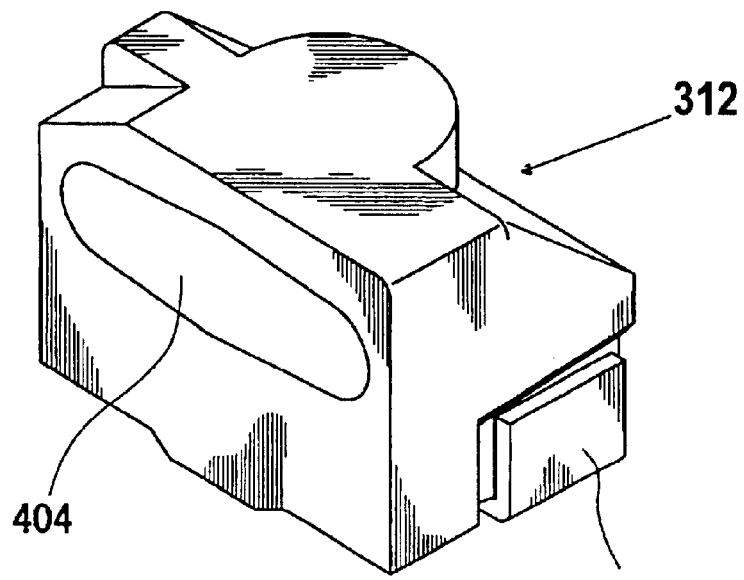
FIG. 4 is a schematic perspective view of a first light emitting diode optically coupled with a first light introducing portion that is a protruding portion.
Figure 5:
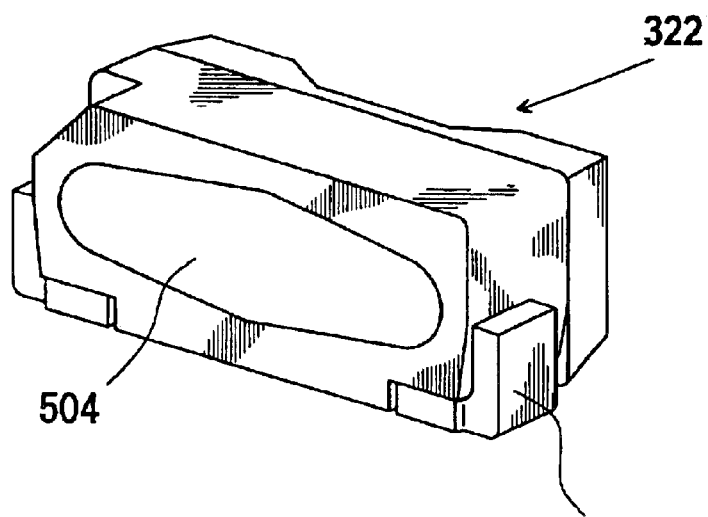
FIG. 5 is a schematic perspective view of a second light emitting diode optically coupled with a second light introducing portion.
Figure 6:
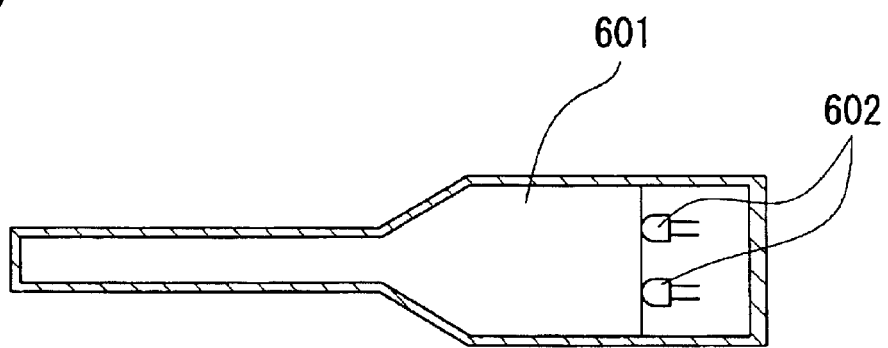
FIG. 6 is a schematic plan view showing the constitution of a needle-shaped light guiding member shown for comparison with the present invention.

Space can be efficiently utilized by mounting the SMD type light emitting diode 322 shown in FIG. 5 that is less than 2 mm in length, less than 1.3 mm in thickness, and has a light emitting window 504 on the protruding portion of the light guiding member 301, and mounting the SMD type light emitting diode 312 shown in FIG. 4 that is less than 3 mm in thickness and has a light emitting window 404 at a position corresponding to the first light introducing portion. The SMD type light emitting diodes 312, 322 can be made by disposing LEDs that have been formed beforehand by flow soldering or the like on a glass epoxy substrate, whereon an electrically conductive pattern has been formed. Each of the light emitting diodes 312, 322 is made in the form of SMD type light emitting diode that comprises an LED chip made of a nitride semiconductor that is capable of emitting blue light, and a resin including YAG: Ce fluorescent substance that is excited by the blue light emitted from the LED chip so as to emit yellow light, namely the complementary color. In the light emitting window of the first light emitting diode 312, the minimum distance of the visible emitting portion from the substrate 103 can be made larger than the maximum distance (thickness) of the second light emitting diode 322. With this construction, a light emitting apparatus of high brightness can be made since light emitted from the first light emitting diode 312 enters the light guiding member 301 without being blocked by the second light emitting diode 322 that is located ahead in the direction of propagation.

A reflector made of acrylic resin including barium titanate was bonded onto the molded light guiding member 301 via epoxy resin used as a transparent adhesive. The reflector is provided except for the principal plane from which light is extracted from the light guiding member and the second end face where light of the light guiding member is introduced. FIG. 9 is a schematic sectional view along line A–A' in FIG. 7 or FIG. 8. As shown in FIG. 9, component parts including the translucent panel 200, the cover 201, the light guiding member 301, the reflecting member 303, the upper light transmitting frame member 204 and the lower frame member 202 are assembled without a gap between the parts. Leakage of light from the light emitting apparatus can be minimized by assembling in this way.

When current is supplied to the light emitting diodes 312, 322, white light enters the light guiding member 301 through the second end face thereof, causing planar emission of light from the principal plane of the light guiding member. The planar light emission source thus made has a high color blending performance and high brightness.

(Embodiment 2)

Figure 7:
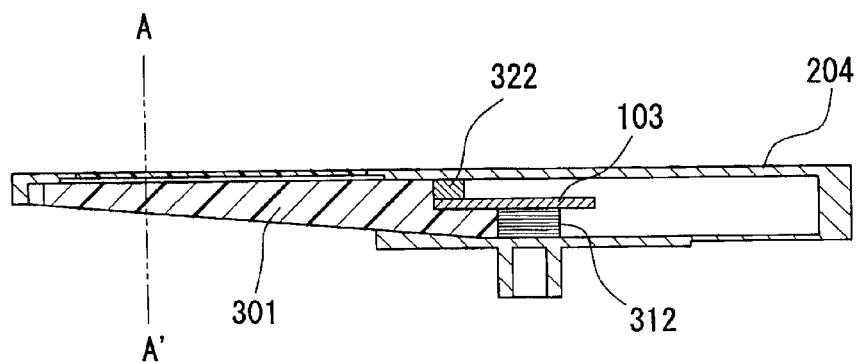
FIG. 7 is a schematic diagram showing an embodiment of the present invention.

FIG. 7 is a schematic sectional view of a second embodiment. Similarly to the first embodiment, the light guiding member 301 has a convex first light introducing portion formed on the second end face thereof to be optically connected to the first light emitting diode 312, and a second light introducing portion formed so as to provide a shorter optical path than that of the first light introducing portion. The surface area of the first light introducing portion of the light guiding member 301 is large, and the surface area of the second light introducing portion is made smaller than the first light introducing portion. Specifically, the rod-shaped light guiding member 301 is about 50 mm in length and has the light introducing portions disposed one above the other, so that the convex first light introducing portion protrudes beyond the second light introducing portion by about 2 mm. The first end face of the light guiding member 301 is about 1.0 mm thick and the first light introducing portion at the second end face is about 1.7 mm thick. The second light introducing portion is about 0.3 mm thick. The substrate 103 is about 0.4 mm thick. The substrate is coated with metal plating such as silver to make a light reflecting surface. Providing the silver plating makes it possible to reflect the light emitted by the light emitting diodes 312, 322 in the direction of the light guiding member with a high reflectivity.

As shown in FIG. 7, the glass epoxy substrate 103 described above is placed on the top surface of the protruding portion of the light guiding member 301, and the SMD type second light emitting diode 322 shown in FIG. 5 that is less than about 2.0 mm in length, less than about 1.3 mm in thickness, and has a light emitting window 504, is disposed on the glass epoxy substrate on the side of the second light introducing portion. In addition, the SMD type first light emitting diode 312 shown in FIG. 4 is less than about 3 mm in thickness and has a light emitting window 404 at a position corresponding to the first light introducing portion, and is placed at the first light introducing portion. The SMD type light emitting diodes 312, 322 may also be constituted by disposing LEDs that have been formed beforehand by flow soldering or the like on the glass epoxy substrate whereon an electrically conductive pattern has been formed.

The first light emitting diode 312 and the second light emitting diode 322 are disposed with a space of about 1.0 to 2.0 mm therebetween. This configuration makes it possible to minimize the thermal influence on the characteristics of the light emitting diodes 312, 322, since heat generated by the light emitting diodes 312, 322 is dissipated through different paths.

The light emitting apparatus was made similarly to the first embodiment, except for the variations described above. When current is supplied to the light emitting diodes 312, 322, white light enters the light guiding member 301 through the end face thereof, causing planar emission of light from the principal plane of the light guiding member 301. The planar light emission source thus made has a high color blending performance and high brightness.

(Embodiment 3)

Figure 8:
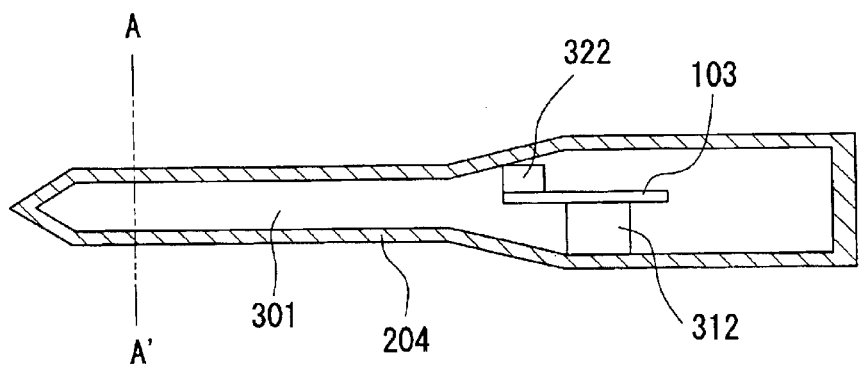
FIG. 8 is a schematic diagram showing an embodiment of the present invention.
Figure 9:
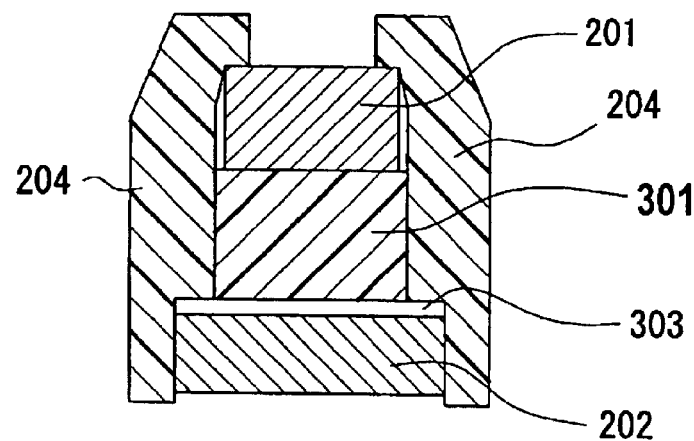
FIG. 9 is a schematic diagram showing an embodiment of the present invention.

FIG. 8 is a schematic plan view of a third embodiment. As shown in FIG. 8, the light guiding member 301 has a convex first light introducing portion formed on the second end face thereof which is to be optically connected to the first light emitting diode 312 and a second light introducing portion formed so as to provide a shorter optical path than that of the convex portion. The surface where the substrate is placed, among the surfaces formed by the convex portion, is formed to be perpendicular to the light emission observing plane of the light emitting apparatus. The surface area of the first light introducing portion of the light guiding member 301 is large and the surface area of the second light introducing portion is smaller than the first light introducing portion. Specifically, the rod-shaped light guiding member 301 is about 50 mm in length has the light introducing portions disposed one above the other, so that the convex first light introducing portion protrudes beyond the second light introducing portion by about 2 mm. The first end face of the light guiding member is about 1 mm thick and the first light introducing portion at the second end face is about 1.7 mm thick. The second light introducing portion is about 0.3 mm thick. The substrate is about 0.4 mm thick, and is placed perpendicular to the light emission observing plane of the light emitting apparatus. The first light emitting diode 312 and the second light emitting diode 322 are disposed with a space of about 1.0 to 2.0 mm therebetween. This configuration makes it possible to minimize the thermal influence on the characteristics of the light emitting diodes 312, 322, since heat generated by the light emitting diodes 312, 322 is dissipated through different paths.

The light emitting apparatus was made similarly to the second embodiment, except for the variations described above. When current is supplied to the light emitting diodes 312, 322, white light enters the light guiding member through the end face thereof, thereby causing a planar emission of light from the principal plane of the light guiding member 301. The planar light emission source thus made has high color blending performance and high brightness.

(Embodiment 4)

FIG. 11 is a schematic sectional view of the fourth embodiment. The cover 201 processed to form prisms thereon is placed on the light guiding member 301, and the light transmitting panel 200 is placed on the cover 201. The light guiding member has, disposed on at least one of the principal plane and the surface that opposes the principal plane, first prism surface 901 having a linear configuration (with triangular prisms therealong) parallel to the side face of the light guiding member 301, and a second set of prisms 902 each smaller than the prisms of the first prism surface 901 and disposed between the plurality of prisms of the first prism surface.

The light emitting apparatus was made similarly to the first through fourth embodiments, except for the variations described above. The constitution of this embodiment makes it possible to improve the efficiency of extracting light in the direction of the light emission observing plane since the light that has been transmitted through the light guiding member 301 is diffracted by the prisms so as to change the direction of propagation to the direction of the light emission observing plane and emerge out of the light emitting apparatus.

(Embodiment 5)

Figure 10:
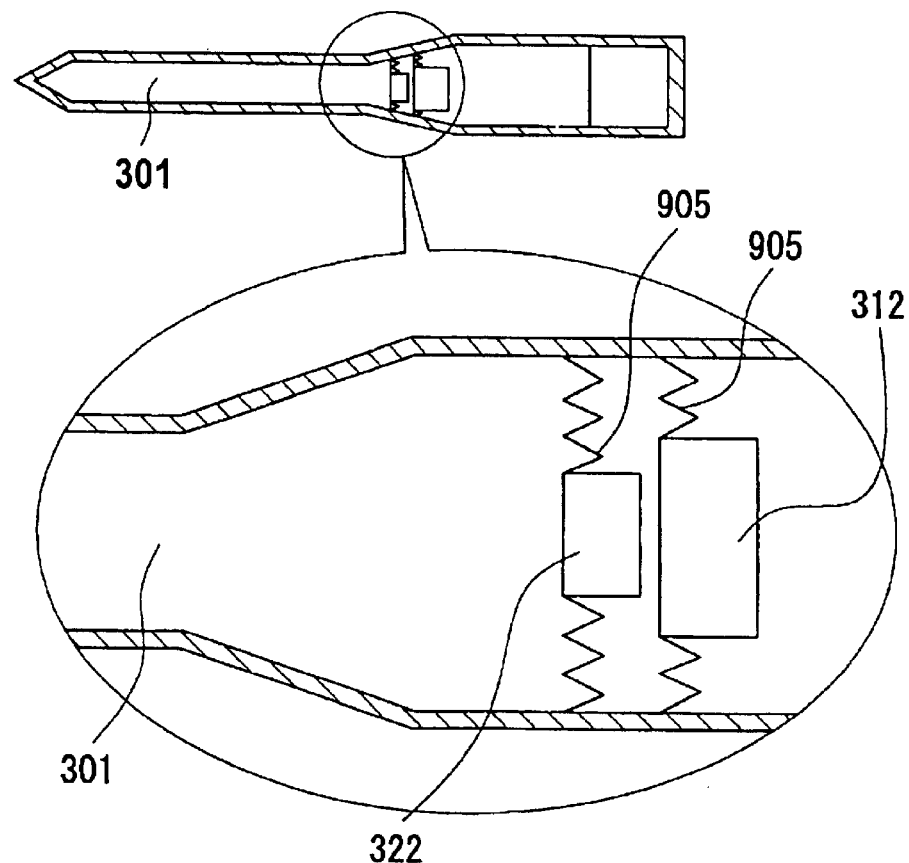
FIG. 10 is a schematic diagram showing an embodiment of the present invention.

FIG. 10 is a schematic plan view of the fifth embodiment. The light guiding member 301 has a convex first light introducing portion formed on the second end face thereof which is to be optically connected to the light emitting diode 312, and a second light introducing portion formed so as to provide a shorter optical path than that of the convex portion. Prisms 905 similar to the fourth embodiment are formed on the second end face whereon the first light introducing portion is formed and on the second end face whereon the second light introducing portion is formed, except for the end face portions that make contact with the light emitting diodes 312, 322. With this constitution, light reflected off the distal end and off the side face of the light guiding member 301 is reflected also on the end face whereon the prisms are formed, thereby improving the efficiency of the light emitting apparatus to extract light.

(Embodiment 6)

Figure 18:
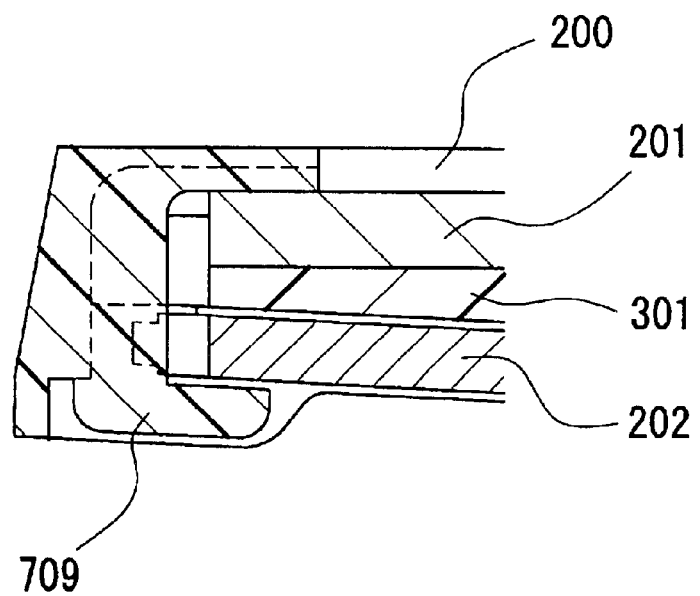
FIG. 18 is a schematic diagram showing an embodiment of the present invention.

FIG. 18 is a schematic plan view of a sixth embodiment. The light emitting apparatus is made similarly to the other embodiments except for fusing the distal (first) end of the light guiding member to the inner surface of the frame member that covers the distal end of the light guiding member, without protruding from the outer surface of the light emitting apparatus. With this construction, light emitted from the distal end of the light guiding member can be prevented from leaking through the external wall surface of the light emitting apparatus.

(Embodiment 7)

Figure 12:
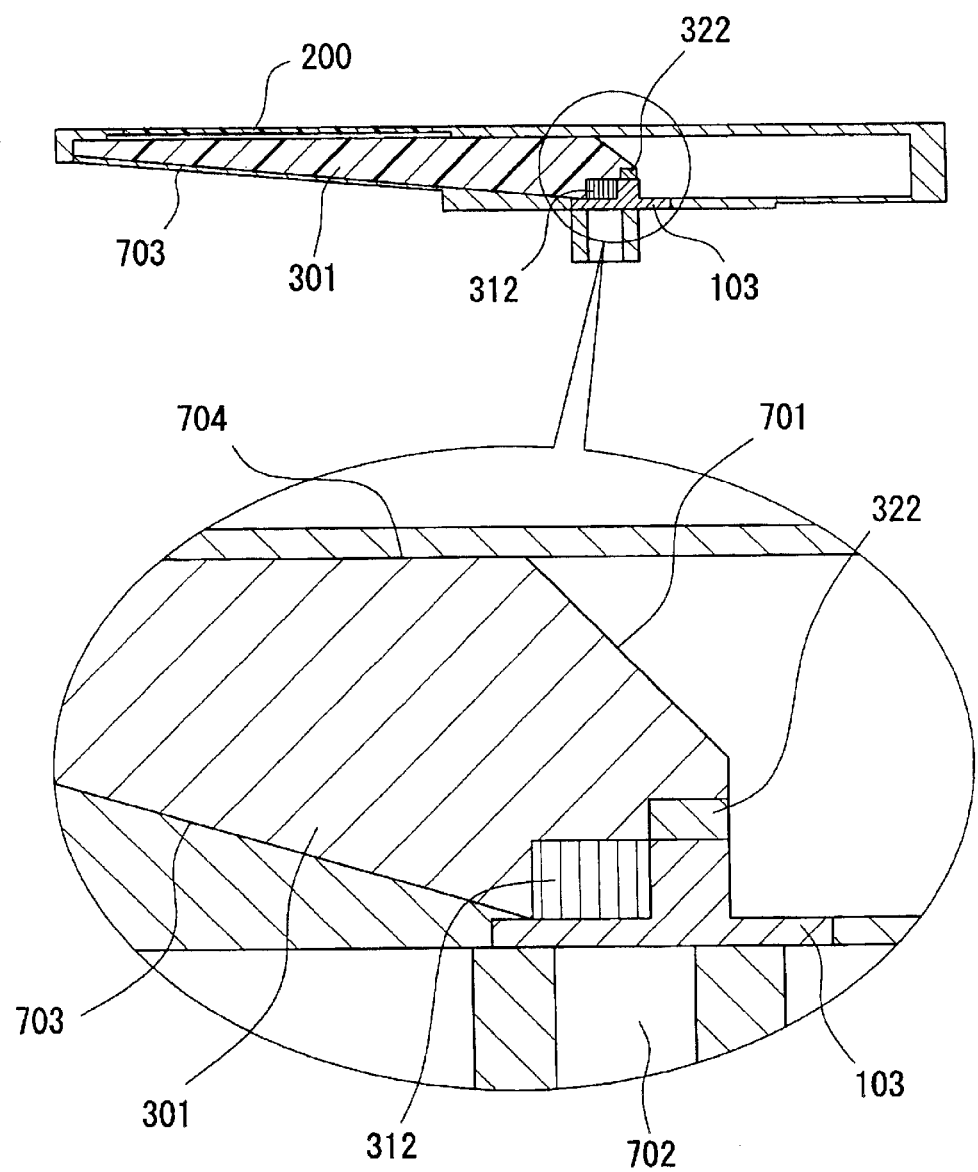
FIG. 12 is a schematic diagram showing an embodiment of the present invention.

FIG. 12 is a schematic sectional view of a seventh embodiment. The second end face located at the side of the light guiding member 301 whereon the light guiding member 301 is optically connected to the light emitting diodes is formed to face the light emission observing plane 704, namely toward the translucent panel 200. Also formed on the second end face are the first light introducing portion that is convex and the second light introducing portion that provides a shorter optical path than that of the convex portion, similarly to the first embodiment. The light reflecting surface 701 is formed on part of the light guiding member 301 at an angle to the light emission observing plane and the second end face. With this constitution, light emitted from the light emitting diodes 312, 322 is reflected off the light reflecting surface 701, is incident on the surface 703 that opposes the light emission observing plane, is directed toward the light emission observing plane 704 and emerges from the light emitting apparatus.

According to this embodiment, a light emitting apparatus that is capable of both satisfactorily blending light color and improving the brightness of light emission and can be made very small can be made by utilizing the reflection in the light guiding member.

(Embodiment 8)

Figure 13:
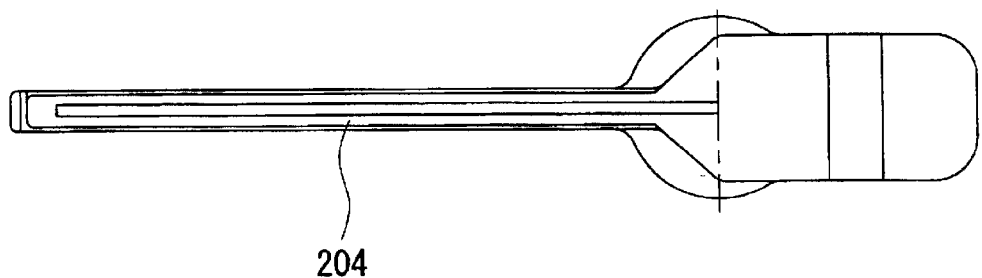
FIG. 13 is a schematic diagram showing an embodiment of the present invention.
Figure 14:
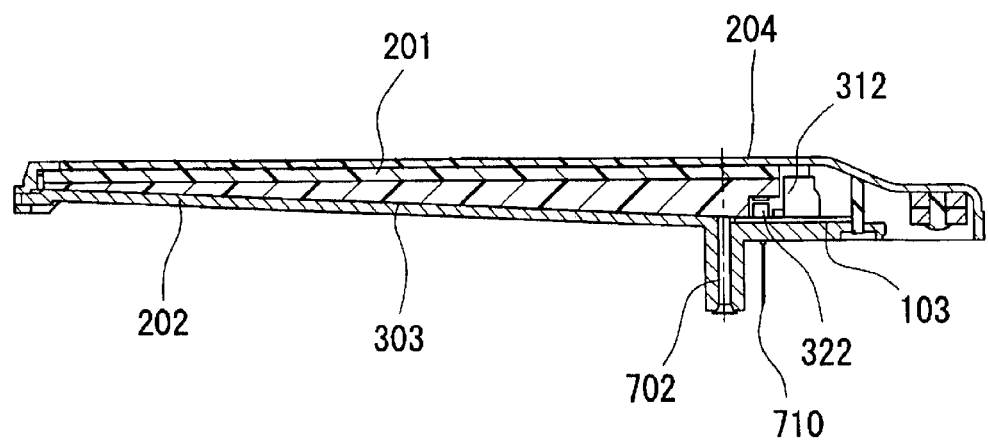
FIG. 14 is a schematic diagram showing an embodiment of the present invention.

FIG. 13 is a plan view showing an eighth embodiment in which the light emitting apparatus of the present invention is used for a meter pointer. FIG. 14 is a sectional view of the pointer. A part of the second end of the light guiding member 301 protrudes with the first light introducing portion and the second light introducing portion being formed thereon. Mounted on the first light introducing portion and the second light introducing portion are the first light emitting diode 312 and the second light emitting diode 322, respectively. The substrate 103 whereon the first light emitting diode 312 and the second light emitting diode 322 are mounted on the same side thereof is placed on the side opposite to the light emission observing plane, namely on the side of shaft 702 of the pointer, and is connected by soldering with a lead electrode 710 that supplies power through a connection with an outside electrode.

FIG. 9 is a schematic sectional view of the pointer of the eighth embodiment. As shown in FIG. 9, component parts including the cover 201, the light guiding member 301, the reflecting member 303, the upper frame member 204 and the lower frame member 202 are assembled without a gap between the parts. A lower side portion of the upper frame member 204 has a thinner wall thickness so that, after fitting the cover 201, the light guiding member 301 and the reflecting member 303 within the upper frame member 204 in this order, the lower frame member 202 is fitted and secured in the thin-walled portion. Leakage of light from the light emitting apparatus can be minimized by assembling in this way.

Since the pointer according to the present invention is free from leakage of light due to such a construction as shown in FIG. 9, only the light from the light observing plane 704 that provides high brightness and satisfactory color-blended light can be observed.

(Embodiment 9)

Figure 15:
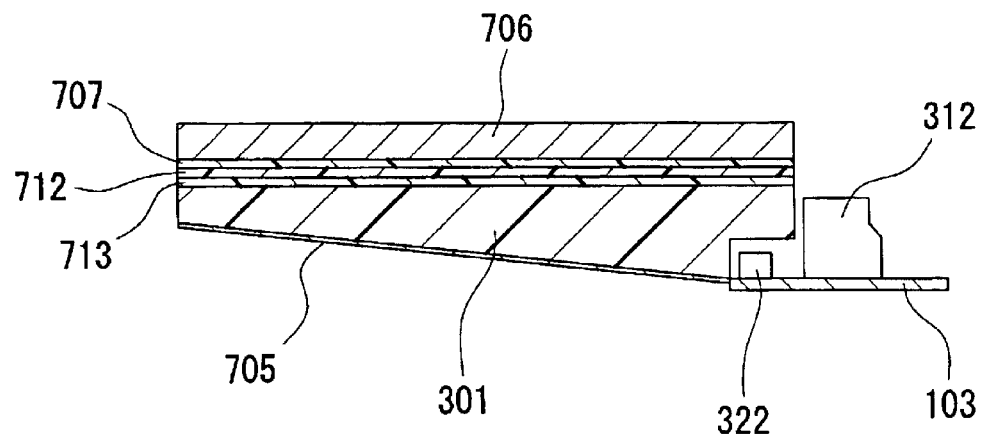
FIG. 15 is a schematic diagram showing an embodiment of the present invention.
Figure 16:
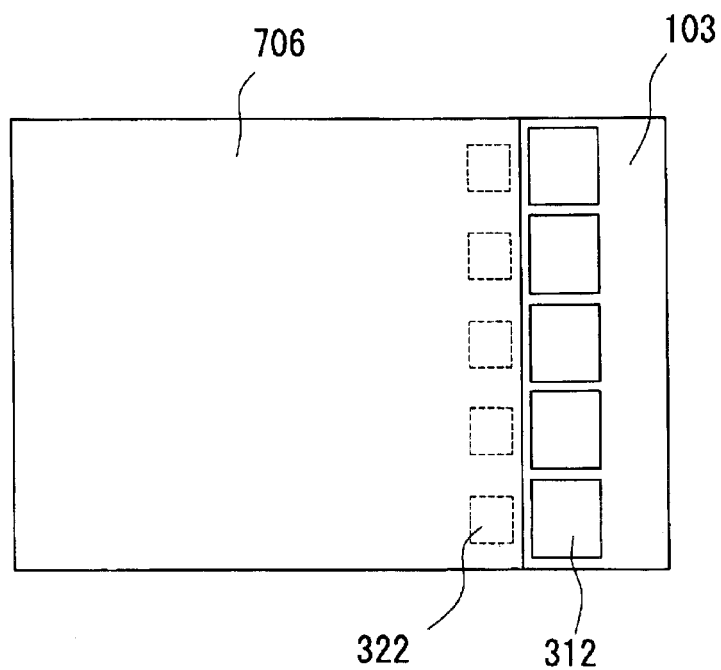
FIG. 16 is a schematic diagram showing an embodiment of the present invention.

FIG. 15 is a sectional view of the light emitting apparatus of the present invention used as the backlight of a TFT liquid crystal display in a ninth embodiment. FIG. 16 is a plan view of the backlight when viewed on the light emission observing plane side. As shown in FIG. 15, a plurality of first light emitting diodes 312 and second light emitting diodes 322 are disposed in rows on the substrate 103. In addition, a diffusion sheet 713, a BEF sheet 712, a BEF sheet 707 and an LCD 706 are placed in this order on the principal plane (top surface) of the light guiding member 301, and a reflector sheet 705 is provided on the surface opposing the principal plane (bottom surface). The light emitting apparatus is made similarly to the previous embodiments except for the variation described above.

Use of the present invention in the backlight makes it possible to provide a display that provides high brightness and satisfactory color-blended light.

(Embodiment 10)

Figure 17:
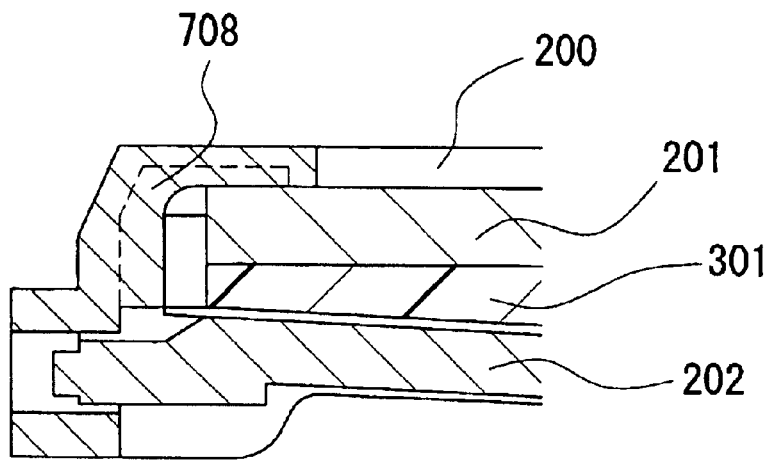
FIG. 17 is a schematic diagram showing an embodiment of the present invention.

FIG. 17 is a schematic sectional view of the light emitting apparatus according to a tenth embodiment. A pointer is made according to the present invention similarly to a previous embodiment except for providing an overhang 708 above the cover 201. Light can be prevented from leaking from the light guiding member 301 at the distal (first) end of the pointer by providing the overhang 708 at the first end of the cover 201. As a result, when the pointer according to this embodiment is used, only the light from the light observing plane 704 that provides high brightness and satisfactory color-blended light can be observed.

(Embodiment 11)

FIG. 18 is a schematic sectional view of the light emitting apparatus according to an eleventh embodiment. A pointer is made according to the present invention similarly to the tenth embodiment, except for providing a resin 709 below the lower frame member 202 at the distal (first) end of the pointer. For the resin in this embodiment, the resin described previously is used. Light can be prevented from leaking from the light guiding member 301 at the distal end of the pointer, by providing the resin 709. As a result, when the pointer according to this embodiment is used, only the light from the light observing plane 704 that provides high brightness and satisfactory color-blended light can be observed.

(Embodiment 12)

Figure 19:
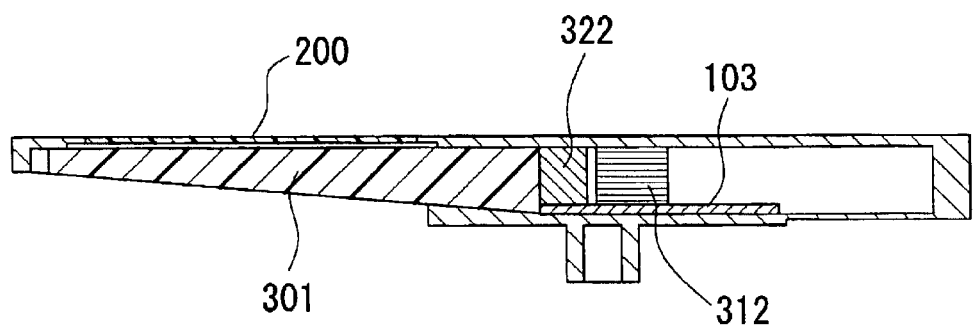
FIG. 19 is a schematic diagram showing an embodiment of the present invention.
Figure 20:
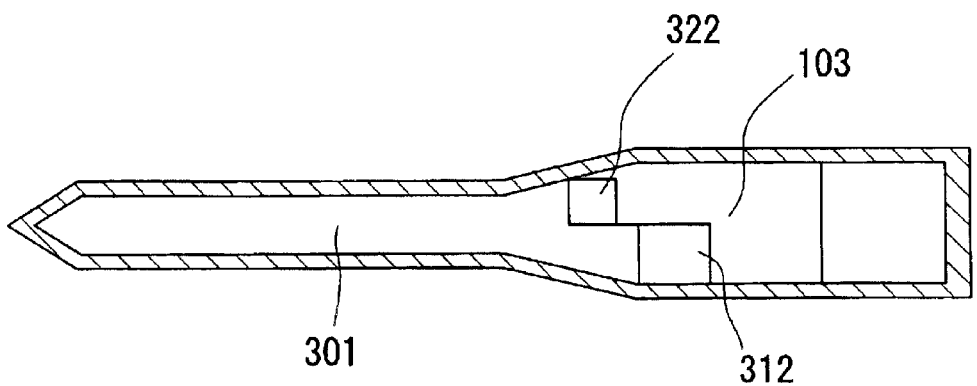
FIG. 20 is a schematic diagram showing an embodiment of the present invention.

FIG. 20 is a schematic plan view of the light emitting apparatus of this embodiment when viewed on the light emission observing plane side. FIG. 19 is a sectional view of the light emitting apparatus of a twelfth embodiment with a cutaway showing the second light emitting diode 322. A part of the second end of the light guiding member 301 protrudes with a first light introducing portion and a second light introducing portion similar to those of the first embodiment being formed thereon. The first light emitting diode 312 and the second light emitting diode 322 are mounted on one surface of the substrate 103 in a staggered arrangement so as to correspond to the first light introducing portion and the second light introducing portion, respectively. The light emitting diodes 312 and 322 may have the same sizes. The substrate 103 is placed on the frame member on the side opposite to the light emission observing plane parallel to the light emission observing plane.

By making the light emitting apparatus in such a construction that the light introducing portions of the plurality of light emitting diodes 312, 322 through which light is introduced into the light guiding member 301 have such a step as in this embodiment, such a light emitting apparatus can be made that is capable of both satisfactorily blending light color and emitting light with high brightness and can be made very small. Also because the substrate is placed on the shaft side of the pointer, heat dissipation performance of the light emitting apparatus can be improved.

(Embodiment 13)

Figure 21:
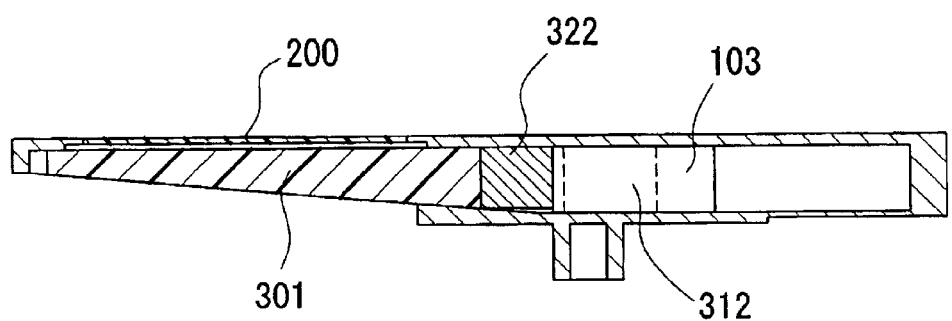
FIG. 21 is a schematic diagram showing an embodiment of the present invention.
Figure 22:
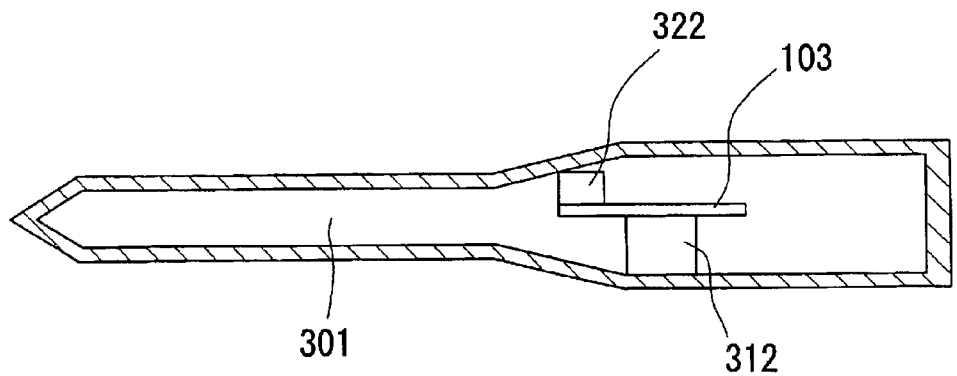
FIG. 22 is a schematic diagram showing an embodiment of the present invention.

FIG. 22 is a schematic plan view of the light emitting apparatus of a thirteenth embodiment when viewed on the light emission observing plane side. FIG. 21 is a sectional view of the light emitting apparatus of this embodiment with a cutaway showing the second light emitting diode 322. The first light emitting diode 312 that is hidden in view by the substrate 103 is indicated with dashed line. A part of the end of the light guiding member 301 protrudes with a first light introducing portion and a second light introducing portion similar to those of the first embodiment being formed thereon. The first light emitting diode 312 and the second light emitting diode 322 are mounted on the surfaces of the substrate 103 in a staggered arrangement so as to correspond to the first light introducing portion and the second light introducing portion, respectively. The light emitting diodes 312 and 322 may have the same sizes. The substrate 103 is placed on the frame member on the side opposite to the light emission observing plane, perpendicular to the light emission observing plane.

By making the light emitting apparatus in such a construction as the light introducing portions of the plurality of light emitting diodes 312, 322 through which light is introduced into the light guiding member 301 have such a step as in this embodiment, such a light emitting apparatus can be made that is capable of both satisfactorily blending light colors and emitting light with high brightness and can be made very small.

(Embodiment 14)

Figure 23:
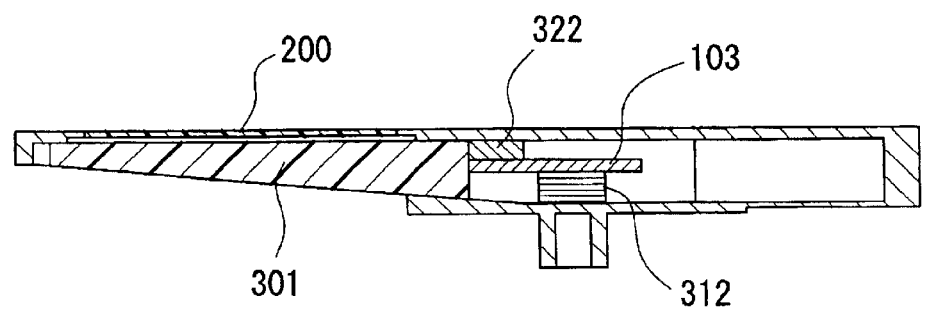
FIG. 23 is a schematic diagram showing an embodiment of the present invention.
Figure 24:
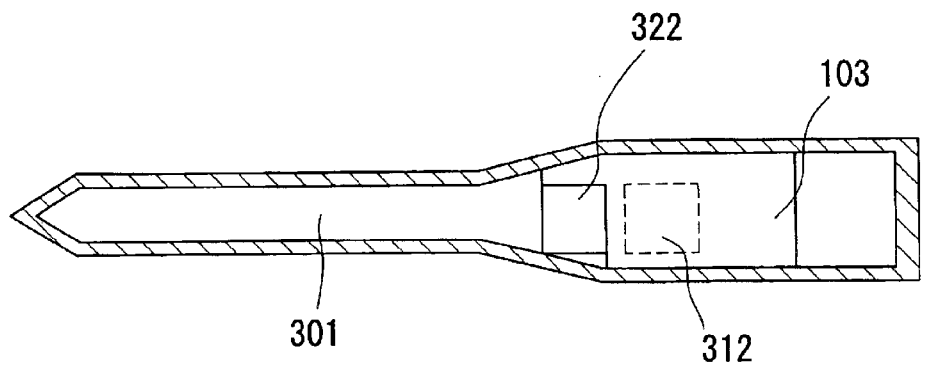
FIG. 24 is a schematic diagram showing an embodiment of the present invention.

FIG. 24 is a schematic plan view of the light emitting apparatus of this embodiment when viewed on the light emission observing plane side. FIG. 23 is a sectional view of the light emitting apparatus of this embodiment when viewed sideways. The first light emitting diode 312 that is hidden in view by the substrate is indicated with dashed lines. A part of the end of the light guiding member 301 protrudes with a first light introducing portion and a second light introducing portion similar to those of the first embodiment being formed thereon. The first light emitting diode 312 and the second light emitting diode 322 are mounted on both surfaces of the substrate 103 in a staggered arrangement so as to correspond to the first light introducing portion and the second light introducing portion, respectively. The light emitting diodes 312 and 322 may have the same sizes. The substrate 103 is placed on the surface of the protruding end in parallel to the light emission observing plane.

By making the light emitting apparatus in such a construction that the light introducing portions of the plurality of light emitting diodes 312, 322 through which light is introduced into the light guiding member 301 have such a step as in this embodiment, such a light emitting apparatus can be made that is capable of both satisfactorily blending light color and emitting light with high brightness and can be made very small.

(Embodiment 15)

Figure 25:
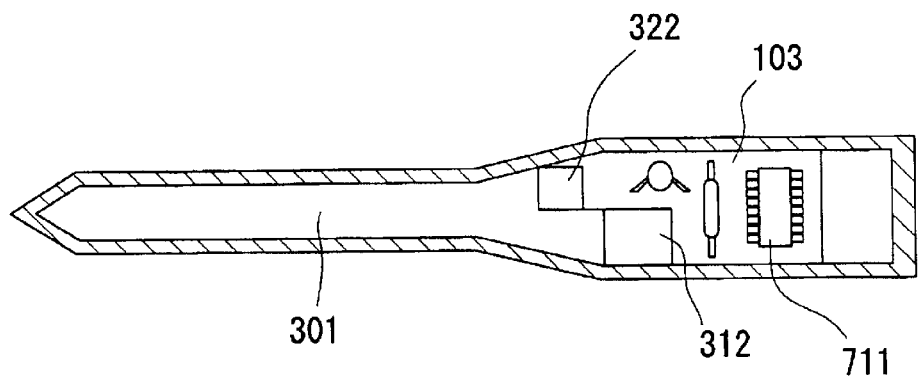
FIG. 25 is a schematic diagram showing an embodiment of the present invention.

FIG. 25 shows circuit components 711 such as resistors, diodes, and ICs mounted on the substrate 103 together with the light emitting diodes 312, 322.

Figure 27A:
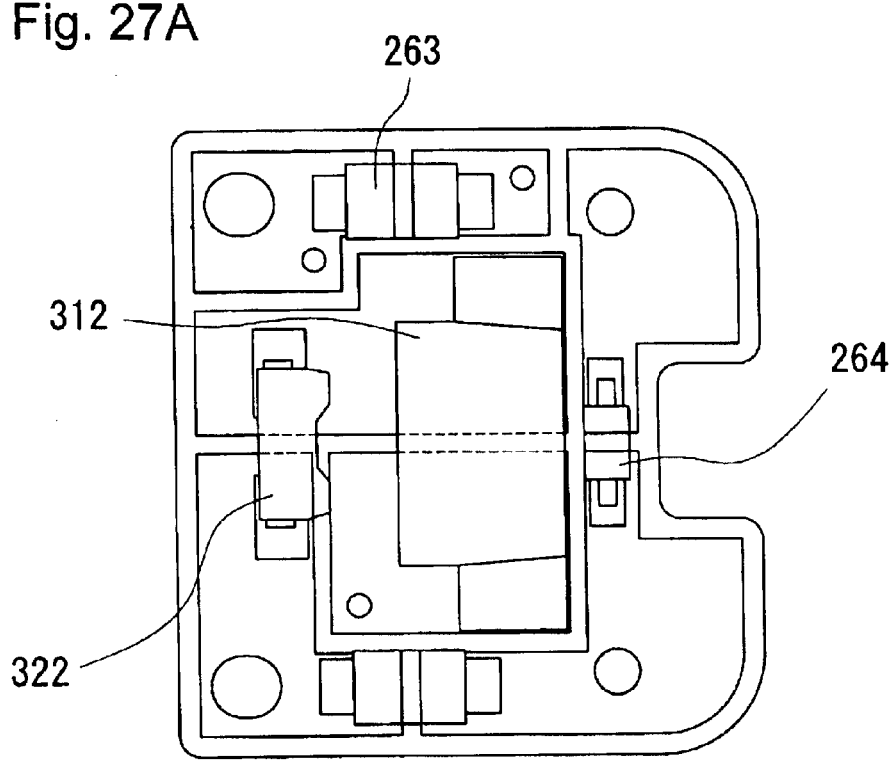
FIGS. 27A and 27B are schematic diagram showing an embodiment of the present invention.
Figure 27B:
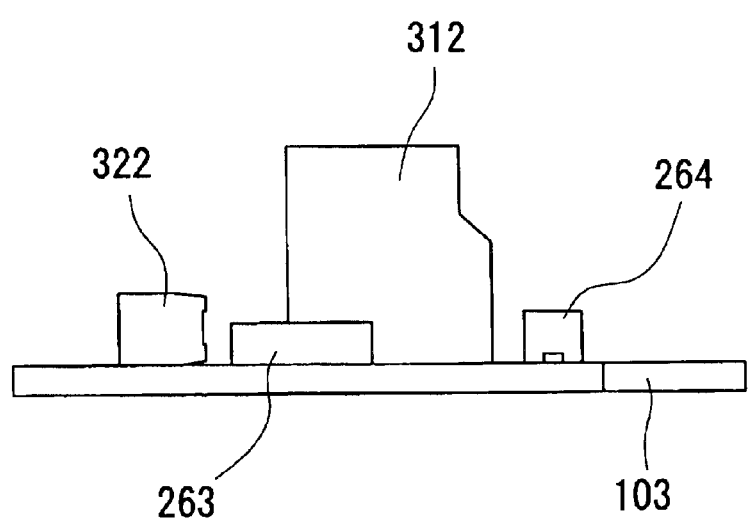

FIG. 27A is a plan view showing a circuit pattern used for the light emitting apparatus in another embodiment, and FIG. 27B is a side view thereof. Leads of the light emitting diodes 312, 322 are connected to an electrically conductive pattern provided on the substrate 103 by soldering. The substrate 103 also has a resistor 263 and a protective diode 264 mounted thereon. Such a constitution makes it possible to effectively use the space on the substrate 103, thereby making the light emitting apparatus that is extremely small in size.

INDUSTRIAL APPLICABILITY

The present invention makes it possible to make a light emitting apparatus that is capable of both satisfactorily blending light colors and emitting light with high brightness and can be made very small, by forming a step on the light introducing portions for the plurality of light emitting diodes through which light is introduced into the light guiding member.

What is claimed is:

1. A light emitting apparatus comprising:
   a light guiding member having:
      an end face for allowing light to be introduced into said light guiding member, said end face having a first light introducing portion and a second light introducing portion, said first light introducing portion having a light introducing surface protruding further than a light introducing surface of said second light introducing portion; and
      a principal face for emitting the light introduced into said light guiding member through said end face;
   a first light emitting diode optically coupled to said protruding light introducing surface of said first light introducing portion; and
   a second light emitting diode optically coupled to said light introducing surface of said second light introducing portion.

2. The light emitting apparatus of claim 1, wherein said protruding light introducing surface of said first light introducing portion is substantially parallel to said light introducing surface of said second light introducing portion.

3. The light emitting apparatus of claim 1, wherein said light guiding member further has a back face opposite said principal face, said protruding light introducing surface of said first light introducing portion intersecting one of a plane of said principal face and a plane of said back face.

4. The light emitting apparatus of claim 1, wherein each of said first light emitting diode and said second light emitting diode are mounted on a surface such that a light emitting window of said first light emitting diode is located farther from said surface than a light emitting window of said second light emitting diode.

5. The light emitting apparatus of claim 1, further comprising a frame and cover enclosing at least a portion of said light guiding member so that said protruding light introducing surface of said first light introducing portion is not visible.

6. The light emitting apparatus of claim 1, wherein said first light emitting diode and said second light emitting diode are each operable to emit color-blended light having at least two peaks in a spectrum of the light.

7. The light emitting apparatus of claim 1, wherein said light emitting apparatus comprises an instrument meter pointer.

8. The light emitting apparatus of claim 1, further comprising a substrate having circuit elements mounted thereon, said first light emitting diode and said second light emitting diode being mounted on said substrate.

9. The light emitting apparatus of claim 1, further comprising a substrate arranged between said first light emitting diode and said second light emitting diode, said first light emitting diode and said second light emitting diode being mounted to opposite surfaces of said substrate.

10. A light emitting apparatus comprising:
a light guiding member having:
a first end face;
a second end face opposite said first end face, for allowing light to be introduced into said light guiding member, said second end face having a first light introducing portion and a second light introducing portion; and
a principal face for emitting the light introduced into said light guiding member through said second end face;
a first light emitting diode optically coupled to a light introducing surface of said first light introducing portion; and
a second light emitting diode optically coupled to a light introducing surface of said second light introducing portion;
wherein light from said first light emitting diode and light from said second light emitting diode travels through said light introducing surface of said first light introducing portion and said light introducing surface of said second light introducing portion, respectively, and along a longitudinal axis of said light guiding member; and
wherein a first optical path between said light introducing surface of said first light introducing portion and said first end face has a different length than a second optical path between said light introducing surface of said second light introducing portion and said first end face.

11. The light emitting apparatus of claim 10, wherein said light introducing surface of said first light introducing portion is substantially parallel to said light introducing surface of said second light introducing portion, and said light introducing surface of each of said first light introducing portion and said second light introducing portion is substantially perpendicular to the longitudinal axis of said light guiding member.

12. The light emitting apparatus of claim 10, wherein each of said first light emitting diode and said second light emitting diode are mounted on a surface such that a light emitting window of said first light emitting diode is located farther from said surface than a light emitting window of said second light emitting diode.

13. The light emitting apparatus of claim 10, further comprising a frame and cover enclosing at least a portion of said light guiding member so that said first light introducing portion and said second light introducing portion are not visible.

14. The light emitting apparatus of claim 10, wherein said first light emitting diode and said second light emitting diode are each operable to emit color-blended light having at least two peaks in a spectrum of the light.

15. The light emitting apparatus of claim 10, wherein said light emitting apparatus comprises an instrument meter pointer.

16. The light emitting apparatus of claim 10, further comprising a substrate having circuit elements mounted thereon, said first light emitting diode and said second light emitting diode being mounted on said substrate.

17. The light emitting apparatus of claim 10, further comprising a substrate arranged between said first light emitting diode and said second light emitting diode, said first light emitting diode and said second light emitting diode being mounted to opposite surfaces of said substrate.

18. The light emitting apparatus of claim 10, wherein said light introducing surface of said first light introducing portion protrudes further in a direction of the longitudinal axis of said light guiding member than said light introducing surface of said second light introducing portion.

19. A vehicle instrument panel display comprising:
a meter pointer including a light emitting apparatus, said light emitting apparatus including:
a light guiding member having:
an end face for allowing light to be introduced into said light guiding member, said end face having a first light introducing portion and a second light introducing portion, said first light introducing portion having a light introducing surface protruding further than a light introducing surface of said second light introducing portion; and
a principal face for emitting the light introduced into said light guiding member through said end face;
a first light emitting diode optically coupled to said protruding light introducing surface of said first light introducing portion; and
a second light emitting diode optically coupled to said light introducing surface of said second light introducing portion.

20. A vehicle instrument panel display comprising:
a meter pointer including a light emitting apparatus, said light emitting apparatus, including:
a light guiding member having:
a first end face;
a second end face opposite said first end face, for allowing light to be introduced into said light guiding member, said second end face having a first light introducing portion and a second light introducing portion; and
a principal face for emitting the light introduced into said light guiding member through said second end face;

a first light emitting diode optically coupled to a light introducing surface of said first light introducing portion; and a second light emitting diode optically coupled to a light introducing surface of said second light introducing portion;

wherein light from said first light emitting diode and light from said second light emitting diode travels through said light introducing surface of said first light introducing portion and said light introducing surface of said second light introducing portion, respectively, and along a longitudinal axis of said light guiding member; and wherein a first optical path between said light introducing surface of said first light introducing portion and said first end face has a different length than a second optical path between said light introducing surface of said second light introducing portion and said first end face.

* * * * *